United States Patent
Baran et al.

(10) Patent No.: US 7,065,428 B2
(45) Date of Patent: Jun. 20, 2006

(54) PROCESSING MACHINE

(75) Inventors: Ralph Baran, Erlangen (DE); Ferdinand Dietz, Stuttgart (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/669,387

(22) Filed: Sep. 24, 2003

(65) Prior Publication Data

US 2004/0059459 A1    Mar. 25, 2004

(30) Foreign Application Priority Data

Sep. 24, 2002  (DE) ................................ 102 44 426

(51) Int. Cl.
    *G06F 15/20*   (2006.01)

(52) U.S. Cl. .................... 700/174; 700/279; 73/660; 369/53.1

(58) Field of Classification Search ................. 700/57, 700/174, 279; 318/128; 451/5; 73/660; 369/53.1

See application file for complete search history.

(56) References Cited

U.S. PATENT DOCUMENTS

| | | | | |
|---|---|---|---|---|
| 4,977,510 A | * | 12/1990 | Winzenz et al. | 701/124 |
| 5,240,358 A | * | 8/1993 | Hackett et al. | 409/141 |
| 5,700,116 A | * | 12/1997 | Cobb, Jr. | 409/141 |
| 6,618,646 B1 | * | 9/2003 | Dyer | 700/279 |
| 6,684,707 B1 | * | 2/2004 | Hagiwara | 73/660 |

FOREIGN PATENT DOCUMENTS

| | | |
|---|---|---|
| DE | 32 14 233 C2 | 10/1983 |
| DE | 34 08 352 C2 | 9/1985 |
| DE | 42 15 723 A1 | 11/1993 |
| DE | 197 17 835 A1 | 10/1998 |
| DE | 199 52 464 A1 | 5/2001 |
| DE | 100 17 014 A1 | 10/2001 |

* cited by examiner

*Primary Examiner*—Leo Picard
*Assistant Examiner*—Douglas S. Lee
(74) *Attorney, Agent, or Firm*—Henry M. Feiereisen

(57) ABSTRACT

A processing machine, in particular a processing center, with a spindle, a tool clamping device, a converter unit with a spindle motor, at least one oscillation sensor and a balancing apparatus is disclosed. The oscillation sensor(s) and the balancing device are connected for signal transmission with a control device of a converter unit. The control device includes a balancing program. The processing machine with this type of automatic balancing system requires less wiring and less space than conventional systems.

7 Claims, 1 Drawing Sheet

PROCESSING MACHINE

CROSS-REFERENCES TO RELATED APPLICATIONS

This application claims the priority of German Patent Application, Serial No. 102 44 426.9, filed Sep. 24, 2002, pursuant to 35 U.S.C. 119(a)–(d), the disclosure of which is incorporated herein by reference.

BACKGROUND OF THE INVENTION

The present invention relates to a processing machine, in particular to a processing center, with a spindle, a tool clamping device, a converter unit with a spindle motor, at least one oscillation sensor and a balancing device.

An imbalance exists if the rotation axis is offset relative to the mass center of gravity of a rotating mass. The rotational imbalance causes the rotational body to generate a centrifugal force. This force is a dynamic function of the frequency of the rotation speed. When the rotation speed doubles, the centrifugal force increases fourfold and can overload the spindle bearing(s). The spindle bearings transmit this dynamic force to the machine frame, producing a more or less pronounced dynamic excursion depending on the stiffness of the machine frame. The amplitude of this dynamic excursion is proportional to the imbalance, with the phase corresponding to the imbalance angle.

The dynamic excursion is measured by an oscillation or vibration sensor. The oscillation sensor can be, for example, a piezoelectric sensor which converts the acceleration into electrical signals. The excursion is determined by a frequency analysis through multiple integration and filtering of the measured signal and is displayed, for example, in units of □m. The phase of the signal can also be measured in addition to the amplitude of the imbalance and used to determine and display the angular position of the imbalance.

By narrow-band filtering the measured signal with a bandpass close to the rotation frequency, oscillation frequencies produced by other excitation sources can be suppressed to produce more exact measurement values.

The imbalance can be best visualized by displaying the oscillation excursion. Conventionally, the oscillation speed is used as a representative measurement unit in oscillation measurements. A simple mathematical relationship is obtained between the oscillation excursion and the oscillation frequency of the oscillation produced by the imbalance.

However, even with great mathematical effort, the relationship between oscillation excursion/oscillation speed and the imbalance can only be calculated approximately. This depends strongly on the measurement location, the machine construction and the materials employed for the spindle, the bearing, the machine frame and the foundation. For this reason, a defined imbalance is applied at a certain radius and the relationship between imbalance and oscillation excursion and/or oscillation speed is established in during a single transient. This process is referred to as calibration. After this setup process, a balancing electronic can calculate the magnitude and the angle position of the balance weights at each subsequent balancing process.

High-speed processing, also referred to as High Speed Cutting (HSC), is a relatively new technology with encouraging performance features and advantages for the metal-cutting industry. Machine spindle rotation speeds in excess of 12,000 $\text{min}^{-1}$ to 50,000 $\text{min}^{-1}$ are advantageous for processing as they significantly increase the quantity of removed material and hence the productivity which in turn enables new cost-effective manufacturing processes. The reduced cutting forces can also improve the surface quality. With increasing spindle rotation speed, the centrifugal forces produced by the mass asymmetries (imbalances) increase with the square of the spindle rotation speed. These large forces can destroy the tools and/or the spindle and produce workpieces with poor surface quality. These imbalances can be eliminated with commercially available automatic balancing systems, which typically include a balancing device and a display and control device with balancing electronics.

These conventional balancing devices are electromechanical units. Two electric motors with special gear units are combined in each balancing device. These assemblies are used to position two independently supported balance masses which then balance the imbalances. The balance masses can be adjusted when the balancing device is at rest as well as during the rotation (at operating rotation speed) of the balancing device. To position the two independently supported balancing masses in the balancing device, the evaluation and control device computes from the measurement results of the oscillation sensors two angular position values, whereby the imbalance is compensated by shifting the masses to the computed angular position values. The actuating motors then move automatically to these positions. The evaluation and control device supplies the required electric power for the motors. The power is transmitted conventionally with brush rings or contactless. Balancing devices of this type can be flanged on or built into the spindle. The magnitude of the imbalance and the available space on the spindle of the processing machine determine the type size of the balancing device to be used.

As mentioned above, the balancing device is used only to adjust the balancing masses so as to eliminate the imbalance. This also requires a display and control device and at least one oscillation sensor. The oscillation sensors are connected with a measurement signal input of the display and control device. The balancing device and a rotation speed sensor of the spindle to be balanced is connected with additional terminals of the display and control device.

The conventional display and control device is also available as a rack-mounted unit or as a tabletop unit. A rack-mounted unit is preferred in processing machines because it can be installed in a control cabinet that forms a part of the processing machine.

If this automatic balancing system is used in a CNC machine, then a balancing module with a CNC connection can be used instead of a display and control device. Also required are a machine interface module as well as a single channel or a dual channel monitor module. A preamplifier may also be necessary. The automatic balancing system with a CNC connection requires significantly more complex and expensive wiring than the aforementioned embodiment. In addition to the wiring expense, the control cabinets of the processing machine must also have sufficient space for the display and control device and/or for the modules.

It would therefore be desirable and advantageous to provide a processing machine with an automatic balancing system, which obviates prior art shortcomings and is able to specifically reduce wiring complexity and space requirements.

SUMMARY OF THE INVENTION

According to one aspect of the present invention, a processing machine or processing center includes a spindle with a clamping device for holding a tool, a spindle motor for rotating the spindle, and a converter unit supplying power to the spindle motor. The converter unit includes gate-turnoff power semiconductors, at least one oscillation sensor located proximate to the spindle, a balancing device with at least one actuator for compensating an imbalance of the tool, and a control device with a processor executing a balancing program implemented in software and integrated in the control device. The control device receives imbalance signals from the oscillation sensor(s) and computes first control signals for the gate-turnoff power semiconductors of the converter unit from a defined relationship between a predetermined desirable rotation speed and a measured or computed actual rotation speed. The control device further computes second control signals for actuating the actuator(s) to compensate the imbalance of the tool.

A display and control device of an automatic balancing system of the afore-described type need not be implemented in hardware. Instead, the display and control device of the automated balancing system can be implemented in software in a control device of a converter unit of a spindle drive of a processing machine. In other words, already existing components of the converter unit of a processing machine can be used for processing and displaying an imbalance. This not only significantly reduces the wiring expenses, but also saves space in the control cabinet of the processing machine. As a result, in the display and control device of the automatic balancing system, only the program for balancing is required with the solution according to the invention, since the control device of the converter unit itself includes a signal processor and/or a microprocessor, which is not highly loaded during the rotation speed control of a spindle.

According to one advantageous feature of a processing machine, the oscillation sensors can be arranged in a bearing region of the spindle. In this way, very small imbalances can be detected, because the oscillation signals produced by an imbalance have the greatest amplitude in the bearing region.

Advantageous embodiments of the invention may include one or more of the following features. The balancing device can be operatively connected with the spindle motor. The oscillation sensor can include an acceleration sensor and the spindle motor can include a permanent excited synchronous machine. The converter unit may include an inverter. The control device of the converter unit may include a microprocessor that executes a software program for generating the control signals in the controller. The balancing device can furthermore include or be operatively connected with an actuator.

BRIEF DESCRIPTION OF THE DRAWING

Other features and advantages of the present invention will be more readily apparent upon reading the following description of currently preferred exemplified embodiments of the invention with reference to the accompanying drawing, in which the sole

DETAILED DESCRIPTION OF PREFERRED EMBODIMENTS

Figure 1:
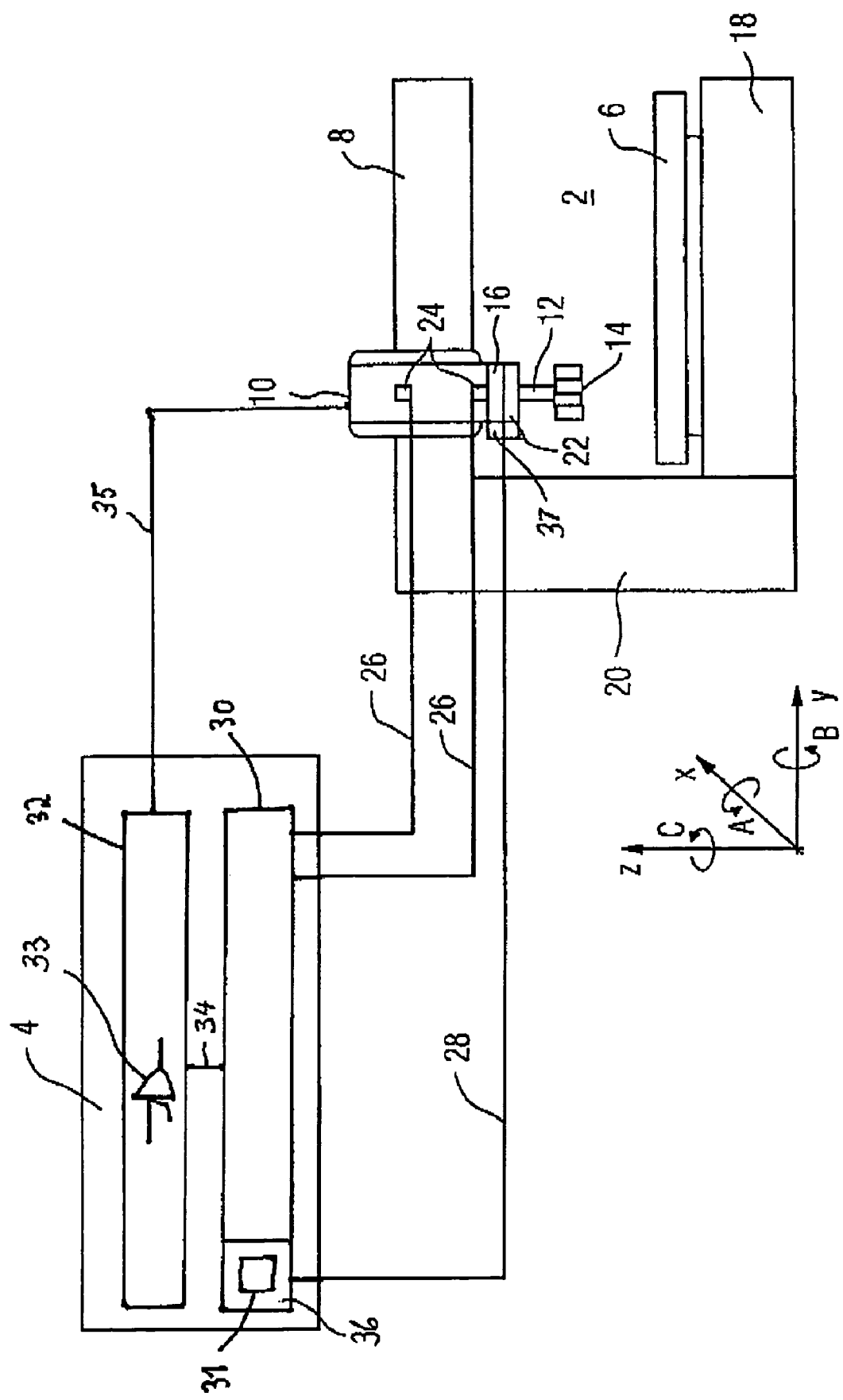
FIG. 1 is a schematic illustration of a processing machine according to the invention.

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a processing machine 2 and a converter unit 4 which is housed in a control cabinet of the processing machine (not shown). The converter unit 4 can include, for example, an inverter 32 with a power section that has a multi-pulse bridge circuit with gate-turnoff power semiconductor switches 33. Instead of an inverter, the converter unit can also include a converter that has an inverter on the load side. If an inverter is used, the converter unit 4 is powered from a common DC intermediate circuit which is not shown in detail. When a converter is used, this converter unit is powered directly from the available AC power grid which is also not shown in detail. Inverters and converters of this type are known in the art. The converter unit 4 also includes a control device 30 which computes from a predetermined desired rotation speed value as a function of a measured or computed actual rotation speed value control signals for the gate-turnoff power semiconductor switches 33 and transmits these control signals to the semiconductor switches 33 via control line 34. The control device 30 can include a conventional signal processor and/or a microcomputer 36 that executes an application program 31. The semiconductor switches 33 of the inverter/converter 32 supply electrical power to the motor 10 via line 35.

The processing machine 2 can also include a machine table 6, a traverse 8, a spindle motor 10, a spindle 12, a tool 14 and a balancing device 16. The machine table 6 is supported on a machine frame 18 which in turn is connected with a foundation (not shown). In order to process workpieces with such processing machine, the tool 14 with the spindle 12 and the spindle motor 10 can be moved along one or several axes. Other embodiments can include:

1) a tool 14 with a spindle 12 and a spindle motor 10 that can be displaced on the traverse 8 in the Y-direction, with the height being adjusted via a co-propagating axle in the Z-direction. One axis of the traverse 8 with column 20 can be moved along the machine table parallel to the X-direction.
2) as under (1) above, with the difference that in this example the traverse 8 with the column 20 is fixed, and the machine table 6 moves past the traverse along an axle parallel to the X-direction.
3) as under (1) and (2) above; however, in order to improve the processing capabilities, two or three additional axles are introduced for tilting the tool 14 with the spindle 12 and the spindle motor 10 about the axes A, B and/or C.

A corresponding drive including a motor and a converter unit is provided for each of the individuals movements in the X-, Y-, Z-, A-, B- and C-directions hardware implementation of the. These additional converter units are also housed in the associated control cabinet of processing machine 2 and powered, if they are implemented as inverters, from the common DC intermediate circuit. The processing machine 2 can also include a tool changing system which is not shown in detail. A processing machine of this type can also be referred to as a processing center.

The tool 14 is clamped by a chucking device 22 which holds a tool spindle 12 formed, for example, as a hollow cone or a steep cone. Such chucking device 22 can be, for example, a chuck for a lathe or drill press, which is known in the art and will therefore not be described in detail. A tool 14 secured in this manner is typically not absolutely centered. In a processing machine 2 with a tool changing system, different tools 14 are clamped many times during a machining operation. Accordingly, different imbalances are generated in the system spindle 12 with tool 14 after each tool change.

Imbalances can be determined by providing at least one oscillation sensor 24. This oscillation sensor 24 used to measure a dynamic excursion is connected by a cable 26 with a converter unit 4 of the spindle drive, in particular with the control device 30 of the spindle device. Since the dynamic excursion produced by the imbalance places a load on the bearings of the spindle motor 10, the oscillation sensor(s) 24 is/are preferably installed proximate to the bearings of the spindle motor 10.

The signal processor or the microcomputer 36 of the control device 30 of the converter unit 4 of the spindle drive computes from the measured dynamic excursions with the help of a balancing software 31 signals that actuate an actuator 37 connected to the balancing device 16. The actuator signals are transmitted from the control device 30 of the converter unit 4 via a cable 28. A method for computing signals from the dynamic excursions for adjusting the balance masses has already been described above.

By integrating a display and control device of the automatic balancing system according to the invention, only the cables 26 and 28 are required for connecting two oscillation sensors 24 and the balancing device 16. This wiring pattern obviates the need for a hardware implementation of the display and control device of the automatic balancing system.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A processing machine, comprising:
   a spindle with a clamping device for holding a tool,
   a spindle motor for rotating the spindle,
   a converter unit supplying power to the spindle motor, said converter unit including gate-turnoff power semiconductors,
   at least one oscillation sensor located proximate to the spindle,
   a balancing device comprising at least one actuator for compensating an imbalance in the spindle, and
   a control device with a processor executing a balancing program implemented in software and integrated in the control device, said control device receiving imbalance signals from the at least one oscillation sensor and computing first control signals for the gate-turnoff power semiconductors of the converter unit from a defined relationship between a predetermined desirable rotation speed and a measured or computed actual rotation speed, said control device further computing second control signals for actuating the at least one actuator to compensate the imbalance of the tool.

2. The processing machine of claim 1, wherein the at least one oscillation sensor is disposed near by the bearings of the spindle.

3. The processing machine of claim 1, wherein the balancing device is operatively connected with the tool clamping device.

4. The processing machine of claim 1, wherein the balancing device is operatively connected with the spindle motor.

5. The processing machine of claim 1, wherein the oscillation sensor comprises an acceleration sensor.

6. The processing machine of claim 1, wherein the spindle motor includes a permanent excited synchronous machine.

7. The processing machine of claim 1, wherein the balancing device includes or is operatively connected with an actuator.

* * * * *